United States Patent [19]

Hiratsuka et al.

[11] Patent Number: 5,337,167
[45] Date of Patent: Aug. 9, 1994

[54] HALFTONE IMAGE FORMING APPARATUS INCLUDING DENSITY BASED DOT ENLARGEMENT

[75] Inventors: Seiichiro Hiratsuka, Kitakyushu; Yuuji Toyomura, Fukuoka, both of Japan

[73] Assignee: Matsushita Electric Industrial Co., Ltd., Osaka, Japan

[21] Appl. No.: 859,201

[22] Filed: Mar. 27, 1992

[30] Foreign Application Priority Data

Apr. 3, 1991 [JP] Japan .................................. 3-079891
May 7, 1991 [JP] Japan .................................. 3-101273

[51] Int. Cl.$^5$ ........................ H04N 1/40; H04N 1/46
[52] U.S. Cl. ..................................... 358/533; 358/534; 358/454; 358/456; 358/458; 358/459; 358/462
[58] Field of Search .............. 358/459, 458, 457, 456, 358/455, 462, 534, 298, 466, 465, 535, 454, 533

[56] References Cited

U.S. PATENT DOCUMENTS 4,931,881 6/1990 Matsui et al. ................. 358/466
4,996,602 2/1991 Ono et al. ..................... 358/457
5,111,302 5/1992 Chan et al. .................... 358/459

FOREIGN PATENT DOCUMENTS 61-154270 7/1986 Japan ............................. H04N 1/40

Primary Examiner—Edward L. Coles, Sr.
Assistant Examiner—Scott A. Rogers
Attorney, Agent, or Firm—Lowe, Price, LeBlanc & Becker

[57] ABSTRACT

An image formation apparatus for performing a gradation recording by changing a size of a dot on the basis of an image data inputted to the apparatus. The apparatus divides an image into a plurality of blocks each comprising a predetermined number of pixels and gives a preferential order with respect to a position within each of the plurality of divided blocks. When the preferential order is higher, the size of the corresponding dot is first enlarged on the basis of a density of the image data. This arrangement can prevent generation of a texture and deterioration of the image resolution irrespective of the case that characters or line drawings are mixed with half-tone pictures in the image.

16 Claims, 9 Drawing Sheets

FIG. 2
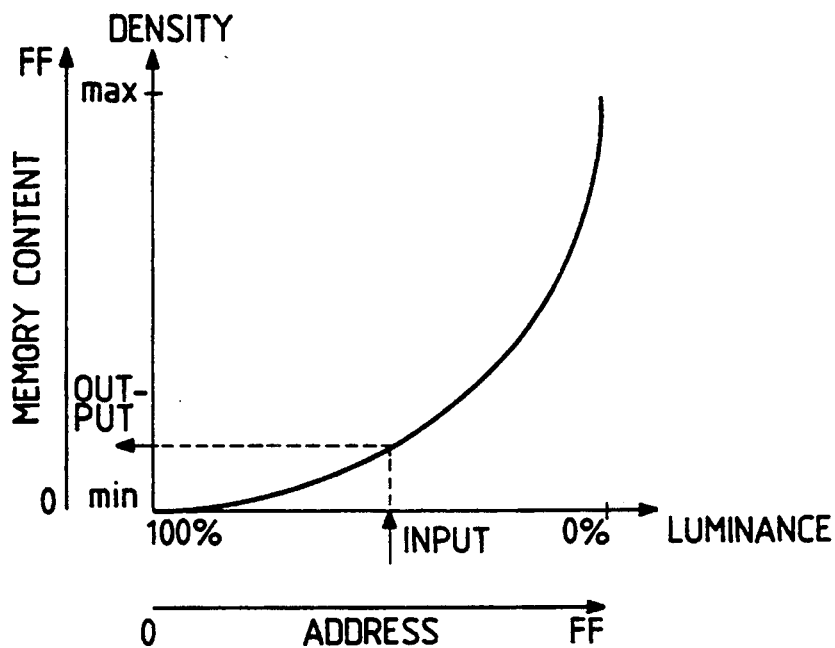
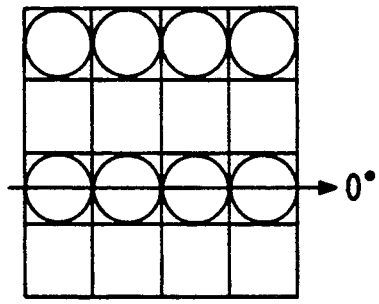
FIG. 4(a)
YELLOW
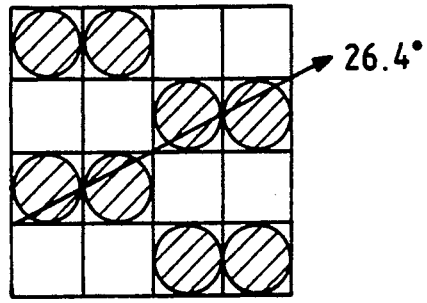
FIG. 4(b)
MAGENTA
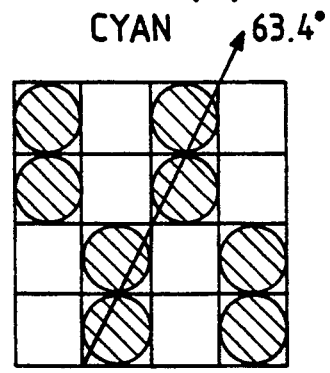
FIG. 4(c)
CYAN
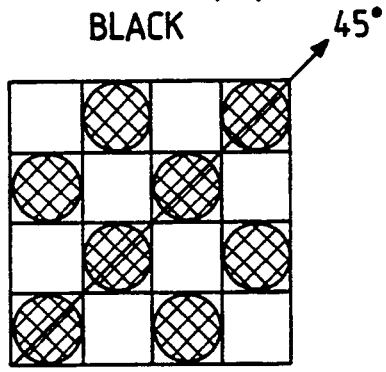
FIG. 4(d)
BLACK

GRADATION CHARACTERISTIC OF EACH PIXEL

GRADATION CHARACTERISTIC OF FIRST-GROWN PIXEL

GRADATION CHARACTERISTIC OF LATER-GROWN PIXEL

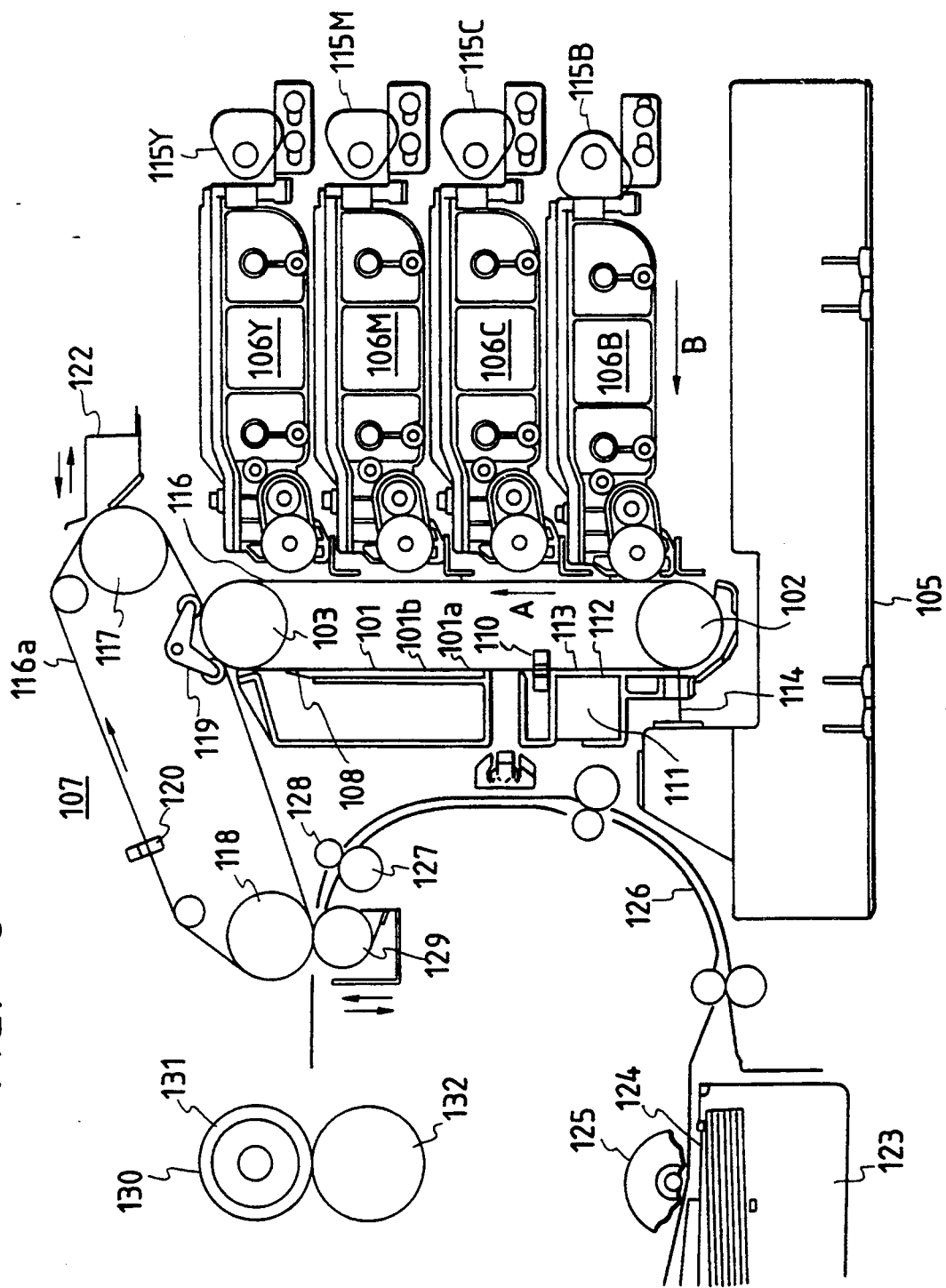

HALFTONE IMAGE FORMING APPARATUS INCLUDING DENSITY BASED DOT ENLARGEMENT

BACKGROUND OF THE INVENTION

The present invention relates generally to high-quality image formation apparatus, and more particularly to such an image formation apparatus for performing a gradation recording by changing the size of dots on the basis of inputted image data.

As an output terminal of a personal computer, a workstation and others, there is known a laser beam printer (which will be referred hereinafter to as LBP) which is based on an electrophotographic technique and a laser technique. Recently, the LBP is widely and increasingly being used because of having great advantages in recording speed and printing quality. Generally, the image output apparatus such as LBP based upon the electrophotographic process tends to be difficult to output a half-tone image because the electrophotographic process has a problem in stability, thus outputting a two-gradation image (black and white color image). For obtaining a half-tone image by such a two-gradation printer, one known technique involves performing the binary-coding of the image pixels in accordance with the dither method. The principle of the dither method will be described hereinbelow with reference to FIGS. 11 and 12. In FIG. 11, the pixels constituting the image are grouped into a plurality of blocks each comprising N pixels×M pixels (4 pixels×4 pixels in the illustration). The level of each of the block pixels is compared with each of N×M matrix thresholds so as to perform the binary-coding in accordance with the comparison results. That is, the pixel is set to "1" when the pixel level is higher than the threshold and set to "0" when being lower than the threshold. A dither image can be obtained by repeatedly performing this binary-coding operation at every each matrix. FIG. 12 shows a circuit arrangement for this binary-coding dither method. In FIG. 12, a comparator is coupled to an input line In and a threshold matrix memory Mx so that an input image signal inputted through the input line In are successively shifted at every pixel and the row and column of the threshold matrix memory Mx are addressed in correspondence with the shifting of the input image signal to successively read out the thresholds to compare the threshold with the input image signal at every pixel, whereby a binary-coded recording image signal is outputted through an output line Out to a print engine (not shown) for printing.

However, not only does the binary-coding dither method cause moire pattern and texture to be generated in the printed image, but also makes it difficult to perform the density adjustment of the image because of the binary-coding of the image data in density. Moreover, in the case that character data are mixed with half-tone picture data, difficulty is encountered to prevent the character quality from being deteriorated because the character is also dithered.

SUMMARY OF THE INVENTION

It is therefore an object of the present invention to provide an image formation apparatus which is capable of easily performing the density adjustment and obtaining a high-grade image with an excellent gradation characteristic without generation of moire' and texture, and without the deterioration of the resolution irrespective of character or line drawing data being mixed with half-tone picture data.

One feature of this invention is that in an image formation apparatus for performing a gradation recording by changing a size of a dot on the basis of an image data inputted to the apparatus, an image is divided into a plurality of blocks each comprising a predetermined number of pixels and a preferential order is given with respect to a position within each of the plurality of divided blocks so that the size of the corresponding dot is first enlarged on the basis of a density of the image data when the preferential order is higher.

Further, according to this invention there is provided an image formation apparatus for performing a gradation recording of a color image by changing a size of a dot on the basis of a color image data inputted, said apparatus comprising: division means for dividing an image into a plurality of blocks each comprising a predetermined number of pixels; first gradation processing means for giving a different preferential order with respect to a position within each of the plurality of divided blocks at every recording color so as to process the image data so that the size of said dot corresponding to the position whose preferential order is higher is first enlarged on the basis of a density of the image data; second gradation processing means for processing the image data so that the size of the dot is enlarged on the basis of the density of the image data irrespective of the position within the block; switching means for performing a switching operation between the first and second gradation processing means in accordance with a kind of the image; and density adjusting means for performing a density adjustment only with respect to the image data processed by the first gradation processing means.

BRIEF DESCRIPTION OF THE DRAWINGS

The object and features of the present invention will become more readily apparent from the following detailed description of the preferred embodiments taken in conjunction with the accompanying drawings in which:

FIG. 2 is an illustration for describing a density conversion characteristic to be used in the FIG. 1 image formation apparatus;

FIG. 4 shows a disposition of first-grown pixels at every recording color;

FIGS. 8 to 10 are illustrations for describing a laser beam printer; and

DETAILED DESCRIPTION OF THE INVENTION

Figure 1:
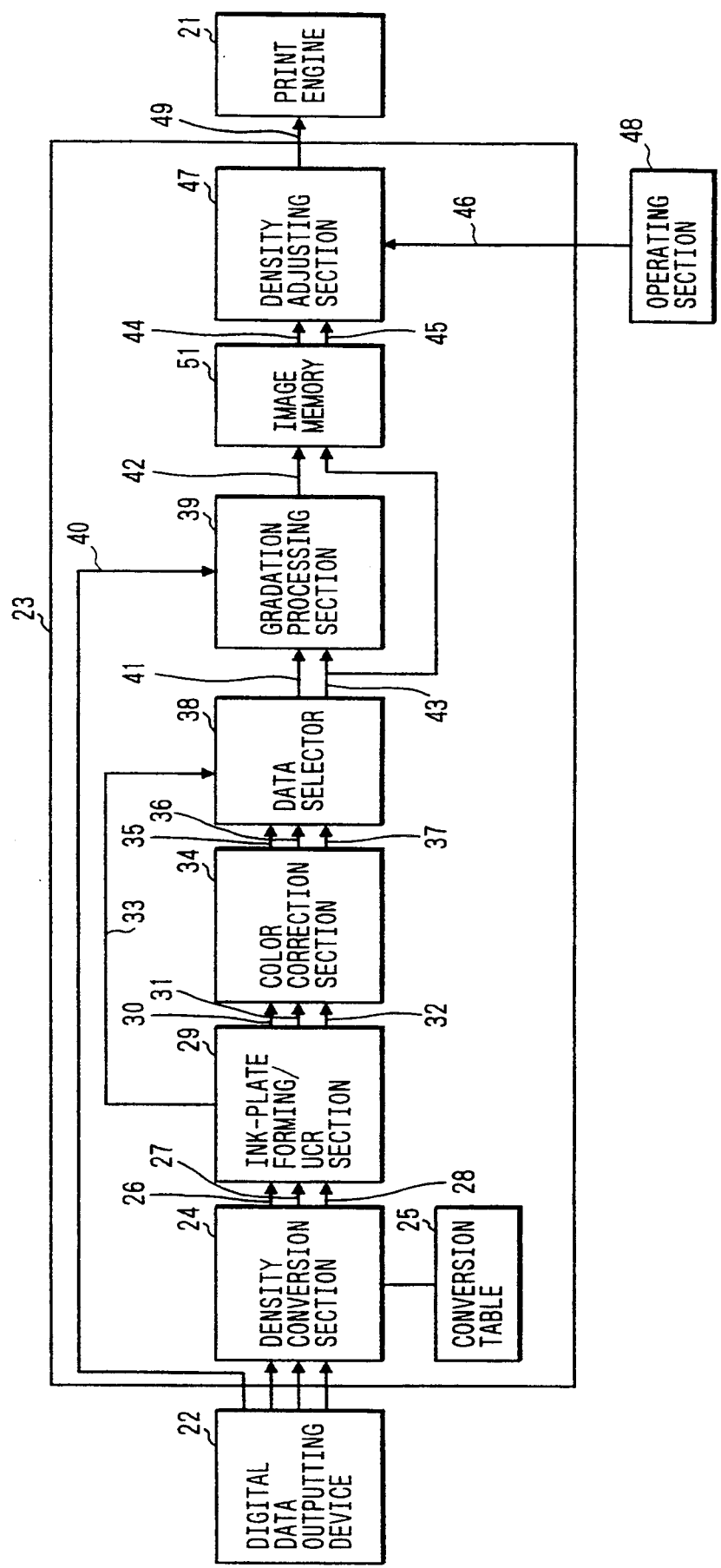
FIG. 1 is a block diagram showing an arrangement of an image formation apparatus according to an embodiment of the present invention.

Referring now to FIG. 1 there is illustrated an arrangement of an image formation apparatus according to an embodiment of the present invention. In FIG. 1, designated at numeral 22 is a digital data outputting device which is responsive to an image signal inputted from an image scanner or video camera (not shown). This digital data outputting device 22 is equipped with an interface or the like to directly receive an image signal from an external communication device, also equipped with a processing means such as an A/D converter and others to process the inputted image data, further equipped with a memory to once store the inputted image data. In response to start of a print engine 21, the digital data outputting device 22 transfers the digital image data and an image discrimination signal 40. This image discrimination signal 40 is indicative of the kinds of the image data, i.e., includes information as to whether the image data is a character, line drawing or half-tone picture. The kind of the image data can be determined on the basis of the printed code when the digital data outputting device 22 receives the image data, and determined with the image area being designated by the user when the image data is inputted from an image scanner or the like. It is also possible to automatically determine the kind of the image data from the image data itself. Here, the image to be processed comprises a sum total 24 bits. That is, 8 bits are given with respect to each of red (R), green (G) and blue (B).

The image data (RGB data) outputted from the digital data outputting device are luminance data and is inputted to an image processing device 23 so as to be first processed by a density conversion section 24. The density conversion section 24 converts the luminance data into density data, i.e., printing primary-color (cyan (C: cyanogen), magenta (M) and yellow (Y)) data. For example, a conversion table 25 is provided which includes a writable memory (RAM) in which a conversion table data as illustrated in FIG. 2 is written, so that the density conversion is realized by adequately offsetting the inputted data value and accessing to the conversion table 25. Generally, the density conversion section 24 controls the single-color density, entire density, contrast, surface color (under-color) and others (i.e., density and color adjustment control).

The CMY (density) data outputted from the density conversion section 24 are inputted through signal lines 26, 27 and 28 to an under-color removing and ink-plate forming section 29 for performing the under-color removing (UCR) process and the ink-plate forming process on the basis of the CMY data. The under-color removing process is effected by removing the data at a constant rate with respect to the intersection amount of the CMY data, and the ink-plate is formed by the removed amount of the data. Conventionally, the under-color removing process and the ink-plate forming process are for replacing the intersection amount of the CMY data with ink in units of one pixel to save the toner. However, they are recently effected for preventing the deterioration of the gradational characteristic in a high-density area, ensuring the contrast and ensuring the grey-balance in the high-density area, for example. It is possible to output a high-quality image by performing the under-color removing process and positively changing the amount of the ink-plate. After the under-color removing process and the ink-plate forming process, the C-data, M-data and Y-data are respectively outputted through data lines 30, 31 and 32 to a color correction section 34, and further the black (Bk) color data is outputted through a data line 33 to a data selector 38.

The color correction section 34 performs processes such as masking with respect to the color components (CMY). The masking is for correcting the influence of the undesired absorption band of each of the respective color toners. For example, C (cyan) toner has an undesired absorption band in the wavelength region other than the C wavelength region. In detail, the C toner includes a Y (yellow) component. Similarly, the M (magenta) toner includes the Y component. Thus, for recording the Y color, it is required to reduce the Y component included in the C and M toners in accordance with the densities of the C and M toners. One approach involves performing the 3×3 matrix calculation of a digital signal or previously writing the calculation result in a read-only memory (ROM) to perform the adding and subtracting calculation after accessing at every color. Although the 3×3 linear masking (first-order masking) is mainly used in the prior art, the first-order masking cannot offer a sufficient effect, and therefore, recently the non-linear masking of the second-order or more is effected, or a new technique is effected which obtains the map function in a space other than the CMY space, for example. The C data, M data and Y data processed by the color correction section 34 are outputted through data lines 35, 36 and 37 to the data selector 38. Here, since the data supplied through the data line 33 from the under-color removing and ink-plate forming section 29 is an achromatic color data, that is, since being not required to be color-corrected in the color correction section 34, the data is directly inputted to the data selector 38. The data selector 38 selects one color data only to output it through a line 41 to a gradation processing section 39. The data selector 38 also outputs a recording color signal through a line 43 to the same gradation processing section 39.

Figure 3:
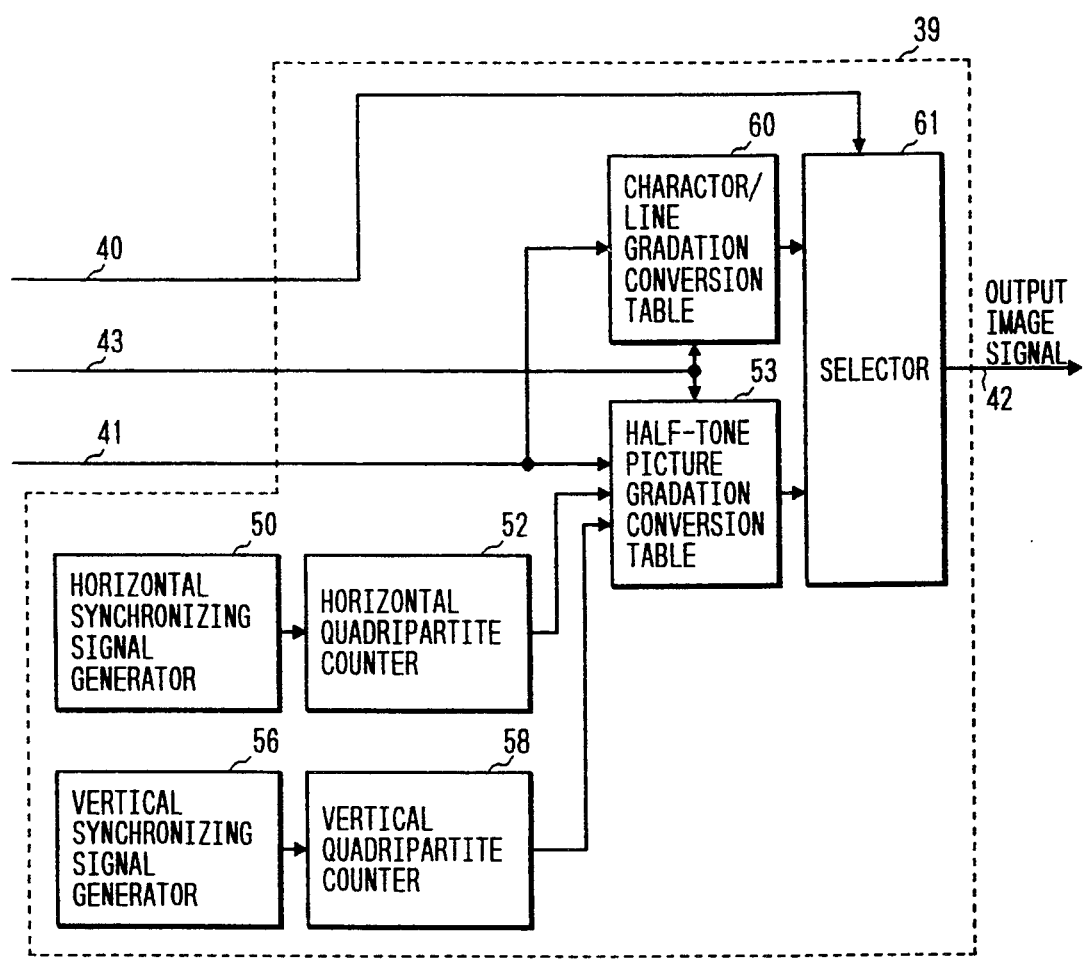
FIG. 3 is a block diagram showing an arrangement of a gradation processing section of the FIG. 1 image formation apparatus.

This gradation processing section 39 is for performing the gradation process and will be described hereinbelow with reference to FIG. 3 to 5. In FIG. 3, the input image signal supplied through the line 41 is inputted to a character/line-drawing gradation conversion table 60 and further to a half-tone picture gradation conversion table 53, and then led through a pair of lines to a selector 61. The selector 61 selectively outputs as a gradation-converted output image signal 42 the signals from the character/line-drawing gradation conversion table 60 and the half-tone picture gradation conversion table 53 in accordance with the above-mentioned image discrimination signal supplied through the line 40. That is, if the image to be processed is a character or a line drawing, the data gradation-converted by the character/line-drawing gradation conversion table 60 is outputted through the selector 61, and if the image is a half-tone picture, the data gradation-converted by the half-tone picture gradation conversion table 53 is outputted through the selector 61. Here, the half-tone picture gradation conversion table 53 is arranged such that the recording color signal is inputted through the line 43 so as to perform the gradation conversion in correspondence with each color, because the gradation characteristic is required to be changed in accordance with the recording color.

Also included in the gradation processing section 39 is a horizontal synchronizing signal generating circuit 50 for generating a horizontal synchronizing signal which is representative of the time interval corresponding to one pixel of the image signal. This horizontal synchronizing signal generating circuit 50 is coupled to a horizontal quadripartite counter 52 for performing the quadripartite counting operation of the outputs thereof to generate a 2-bit count value. Further included in the gradation processing section 39 is a vertical synchronizing signal generating circuit 56 for generating a vertical synchronizing signal at a predetermined time interval necessary for the gradation processing. This vertical synchronizing signal generating circuit 56 is coupled to a vertical quadripartite counter 58 for performing the quadripartite counting operation of the outputs thereof to generate a 2-bit count value. The count values of the horizontal and vertical quadripartite counters 52 and 58 are used to determine the position of the image data in the 4 pixel×4 pixel block.

In the case of a color recording image, a screen angle method is used in order to prevent generation of moire' patterns between the recording color. That is, in accordance with the recording position of the image data, the image is divided into blocks each comprising 4 pixels×4 pixels, and the pixels of each block are grouped into the pixels to be first grown (enlarged) and the pixels to be later grown. This grouping is arranged to be different between the recording colors Bk, C, M and Y. For example, as illustrated by (a), (b), (c) and (d) of FIG. 4, the screen angles are made such that Bk, C, M and Y take 45°, 63.4°, 26.4° and 0°, respectively, thereby avoiding the generation of moire patterns due to the interference between the recording colors. The data values of the first-grown pixels and the later-grown pixels are converted at every address by the conversion table into level signals (for example, pulse width data) which drive the laser in practice. As one simple and preferable conversion technique, the data are previously written in a ROM or RAM and then called with the block position information and input image signal level being used as the address. The image data converted into the actually laser-driving data at every pixel of the block as aforementioned is stored as a gradation-converted image signal in an image memory 51 (see FIG. 1).

Figure 5A:
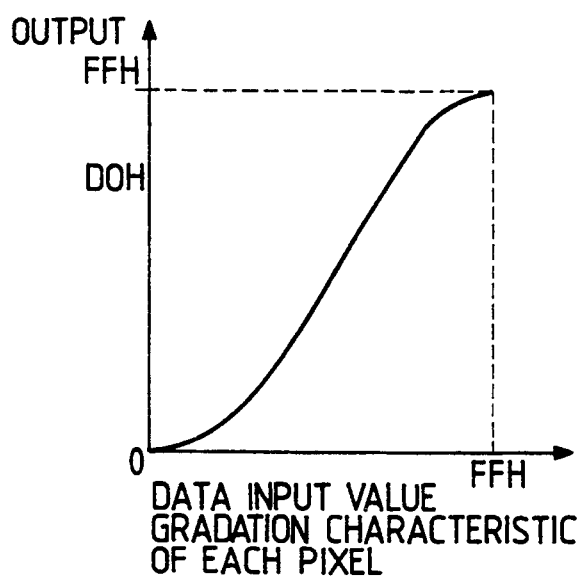
FIGS. 5A to 5C are illustrations for describing gradation characteristics.
Figure 5B:
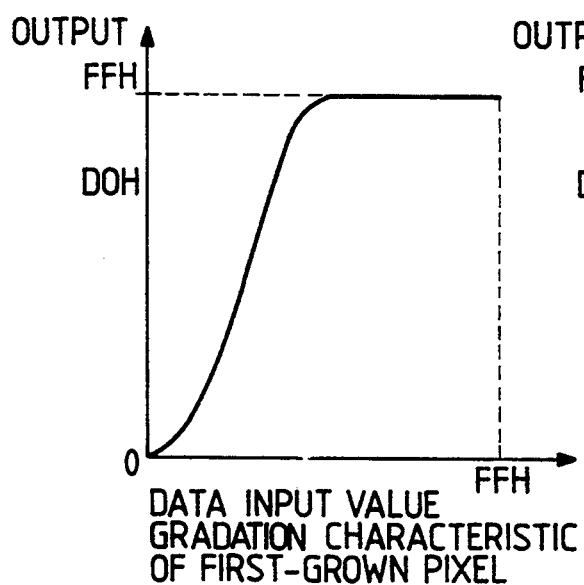
Figure 5C:
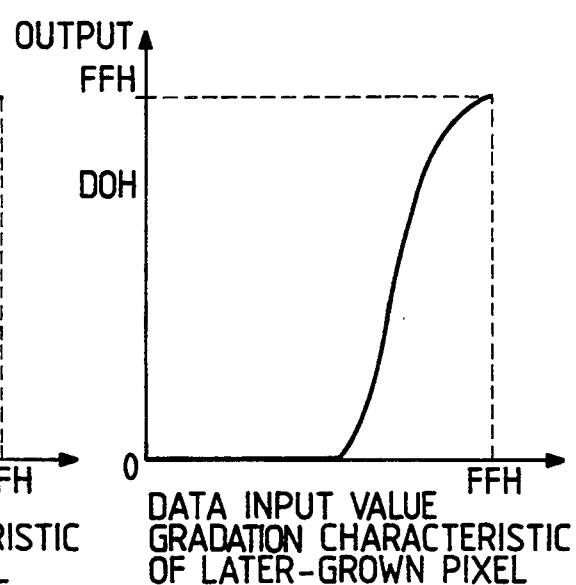

FIGS. 5A to 5C show pixel data conversion table characteristics. FIGS. 5B and 5C show the conversion table characteristics in the case that the image to be processed is a half-tone picture. For the conversion, the gradation characteristic for the first-grown pixel or the gradation characteristic for the later-grown pixel is taken on the basis of the position of the pixel, to be converted, in the 4 pixel×4 pixel block. On the other hand, FIG. 5A shows the conversion table characteristic in the case that the pixel to be processed is a character or line drawing. The gradation conversion is effected irrespective of the position of the pixel in the 4 pixel×4 pixel block. With the conversion table characteristic being changed in accordance with whether the image to be processed is a half-tone picture or a character/line drawing, the character and line drawing are gradation-converted in units of one pixel and hence it is possible to improve the resolution. Further, in the case of the half-tone picture, the generation of the moire patterns can be prevented because the gradation conversion characteristics of the dots in the block are different. In addition, since the pixels in the block are divided into the first-grown pixels and the later-grown pixels so that the concentration of the data is forced with respect to the first-grown pixels, a great electric field can be applied to a microscopic area of an electrostatic latent image formed on a photosensitive device, thereby making stable the gradation characteristic with respect to all the density regions and allowing the recording of a high-quality image irrespective of the character and line drawing being mixed with the half-tone picture.

Here, although in this embodiment the same gradation conversion is made with respect to both the character and line drawing, in the case that the recording color data is an intermediate hue and the width of the line is large, if the dots corresponding to the portion other than the edge portions of the lines are preferentially grown in the block and the same gradation conversion is effected with respect to the edge portions, it is possible to smooth the edge portions. In addition, although in this embodiment the size of the block of the half-tone picture portion is disclosed as being 4 pixels×4 pixels in the main scanning directions and the secondary scanning directions, it is possible to set it to a given size and further to change the number of the pixels that the dots are preferentially grown in the block. Moreover, although in this embodiment the screen angle is formed by changing the first-grown pixels in the block to thereby prevent the generation of the moire, it is also appropriate that the block is arranged to take a different size at every recording color. This arrangement can also prevent the generation of the moire.

Figure 6:
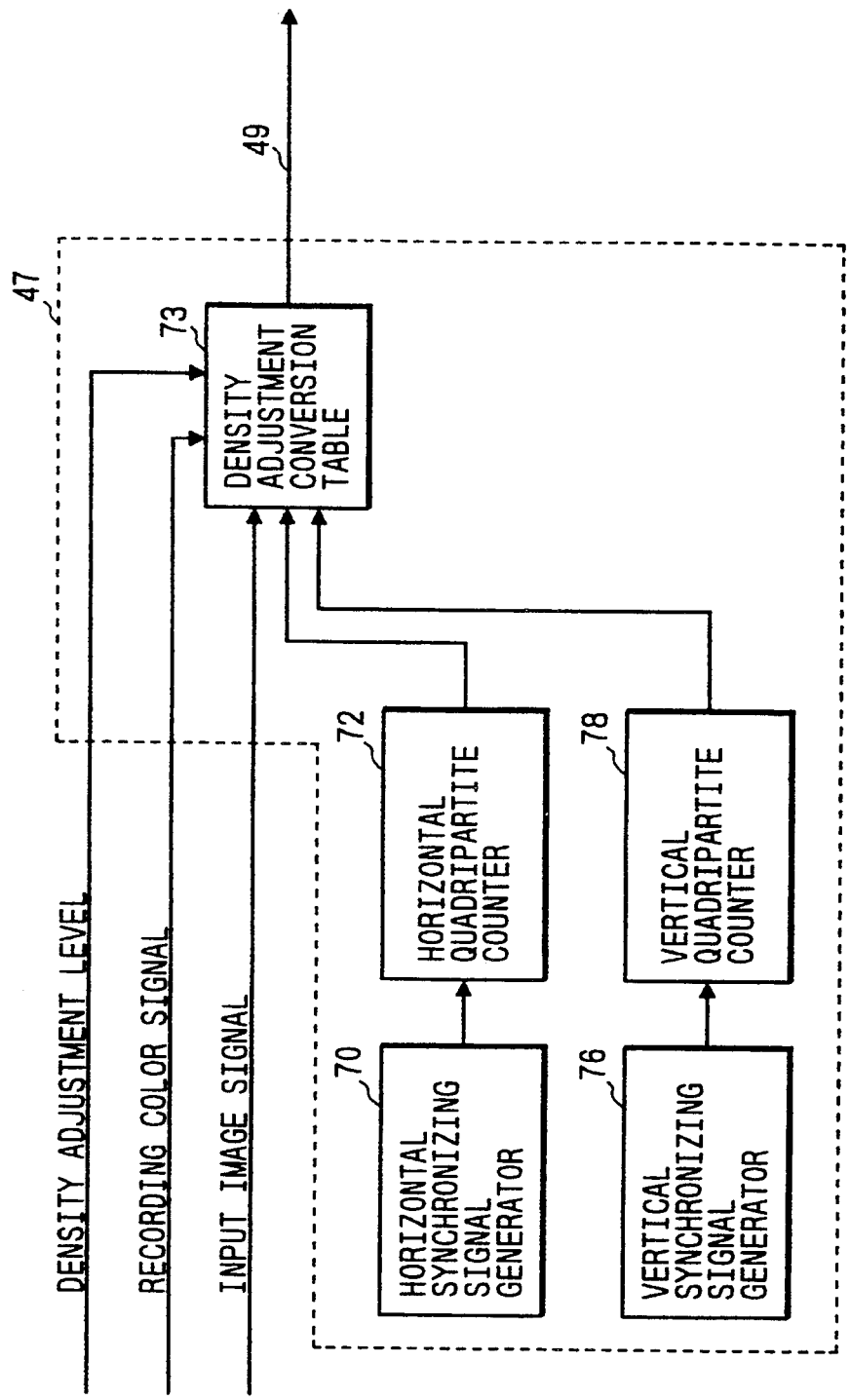
FIG. 6 is a block diagram showing an arrangement of a density adjusting section of the FIG. 1 image formation apparatus.

The image data outputted from the gradation processing section 39 and stored in the image memory 51 is read out in synchronism with the operation of the print engine 21 and inputted as the input image signal through a line 44 to a density adjusting section 47. In the density adjusting section 47 the image data is density-adjusted in accordance with a density adjustment level supplied from an operating section 48 through a line 46. A detailed description of the density adjusting section 47 will be made hereinbelow with reference to FIGS. 6 and 7A to 7D. FIG. 6 shows an arrangement of the density adjusting section 47. In FIG. 6, the input image signal supplied through the line 44 is inputted to a density adjustment conversion table 73 and then outputted as a density adjusted output image signal through a line 49. The density adjustment conversion table 73 is also responsive to the recording color signal supplied through the line 45 so as to change the density adjustment conversion table characteristic at every color. Although in the above-described gradation processing section 39 the screen angle technique is used to prevent the moire patterns between the recording colors, that is, the image is divided into the blocks comprising 4 pixels×4 pixels so that the pixels are grouped into first-grown pixels and the later-grown pixels, similarly in the case of the density adjustment, horizontal quadripartite counter 72 coupled to a horizontal synchronizing signal generating circuit 70 and vertical quadripartite counter 78 coupled to a vertical synchronizing signal generating circuit 76 discriminate the position of the currently inputted image data in the 4-pixel×4-pixel block so as to distinguish between the first-grown pixel and the later-grown pixel at every color. The data values of the first-grown pixel and the later-grown pixel are conversion-processed by the density adjustment conversion table 73 at every position of the pixel in the block. As a simple and preferable conversion technique, the data is previously written in a ROM or RAM and called with the position information in the block and the input image signal level being used as the address.

Figure 7A:
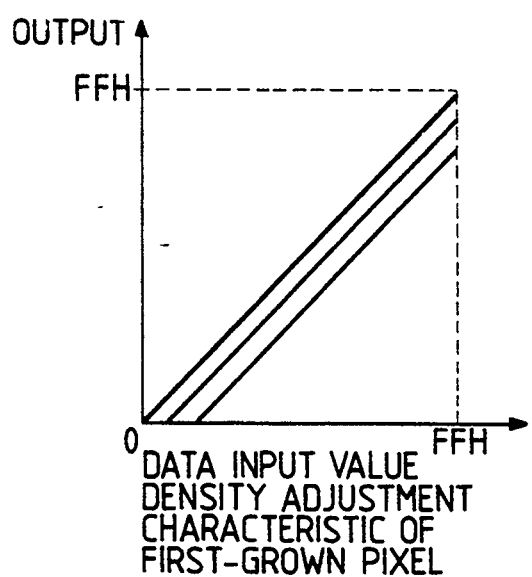
FIGS. 7A to 7D are illustrations for describing density adjustment table characteristics.
Figure 7B:
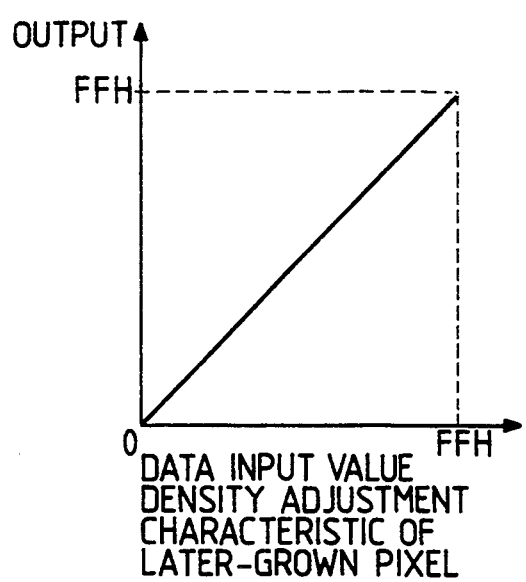
Figure 7C:
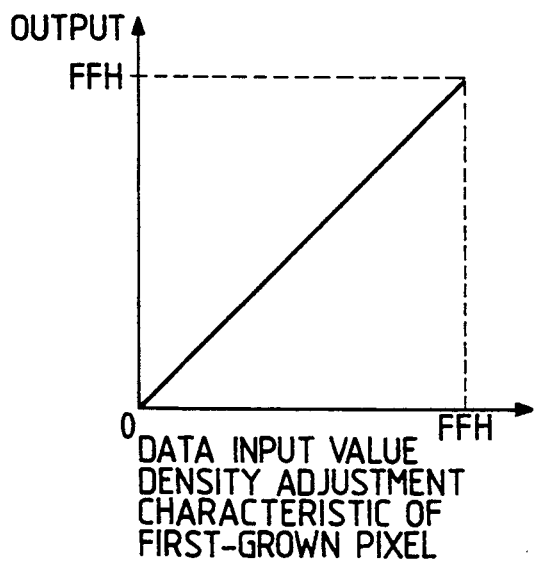
Figure 7D:
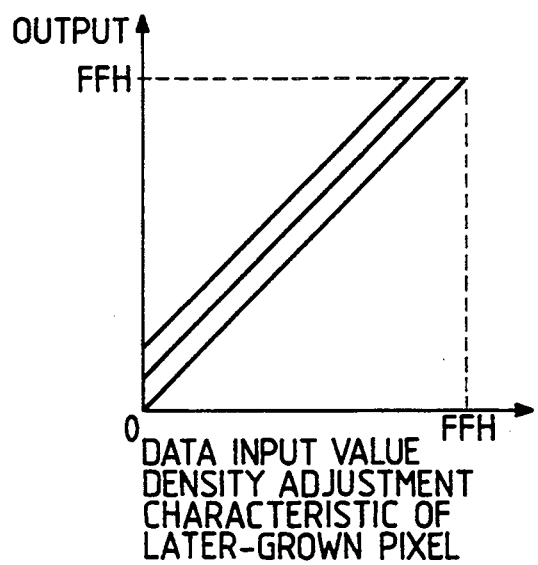

In the density adjustment process of this embodiment, when lowering the density, the recording signal level is lowered only with respect to the first-grown pixel as shown in FIGS. 7A and 7B, and when heightening the density, the recording signal level is heightened only with respect to the later-grown pixel as illustrated in FIGS. 7C and 7D. Here, although it is possible to perform the density adjustment by changing the recording signal level with respect to both pixels, in the case of lowering the density, when a dot is not formed in the later-grown pixel, difficulty is encountered to further lower the recording signal level, whereby there is the possibility that the density adjustment amount becomes different at every block from the case of the formation of the dot in the later-grown pixel. In this embodiment, the density is lowered by decreasing the pixel that the dot exists and heightened by increasing the pixel that the dot does not exist, thereby uniformly performing the density adjustment.

The image data density-processed in the density adjusting section 47 is outputted to the print engine 21 to perform the recording of the image.

As described above, according to this embodiment, since the image data is divided into blocks each comprising a plurality of pixels and in each block the dots are grown in the order of heightening preference so that the image density adjustment is effected on the basis of the pixel having a specific preference, it is possible to perform the density adjustment which is not allowed by the image processing based on the dither method, thus easily obtaining a recording image with an adequate density.

Furthermore, a description will be made hereinbelow with reference to FIGS. 8 to 10 in terms of a laser beam printer. The laser beam printer is arranged so as to form a color image in accordance with the electrophotographic process technique, i.e., to selectively emit and focus a light beam corresponding to each color onto a photosensitive device having a photosensitive layer on its surface so that a plurality of electrostatic latent images are formed and developed with the corresponding color toners and a plurality of toner images are put one on top of the other to form a color image on a copy sheet. In FIG. 8, designated at numeral 101 is a photosensitive device comprising a closed-loop belt made of a resin or the like, the the closed-loop belt having a joint 101a and the outer surface thereof being coated with a thin-film photosensitive layer made of a selenium (Se) or an organic photosensitive material (OPC). This photosensitive device 101 is supported by two photosensitive-device carrying rollers 102 and 103 so as to be vertically movable and rotatable in a direction indicated by an arrow A in accordance with rotation of a drive motor (not shown). At positions facing the outer surface of the photosensitive device 101 and taken along the rotating direction indicated by the arrow A there are disposed an electrifying device 104, an exposure optical system 105, developing devices 106B, 106C, 106M, 106Y (including black (B) toner, cyan (C) toner, magenta (M) toner and yellow (Y) toner, respectively), an intermediate transfer unit 107, a cleaning device 108, a charge-removing device 109 and a photosensitive reference position sensor 110.

The electrifying device 104 is composed of an electrifying line 111 made of a tungsten wire, a grid plate 113 and a shield plate 112 constructed by a metallic plate. When applying a high voltage to the electrifying line 111, a corona discharge occurs in the electrifying line 111 whereby the photosensitive device 101 is evenly electrified through the grid plate 113. The exposure optical system 105 emits an exposure light beam 114 corresponding to an image data toward the photosensitive device 101. In the laser beam printer, the exposure light beam 114 can be obtained with an image signal intensity-modulated or pulse-width-modulated by a laser drive circuit (not shown) is applied from a gradation conversion device to a semiconductor laser device (not shown). With the exposure light beams, a plurality of electrostatic latent images each corresponding to each of color components are formed on the photosensitive device 101.

Figure 9:
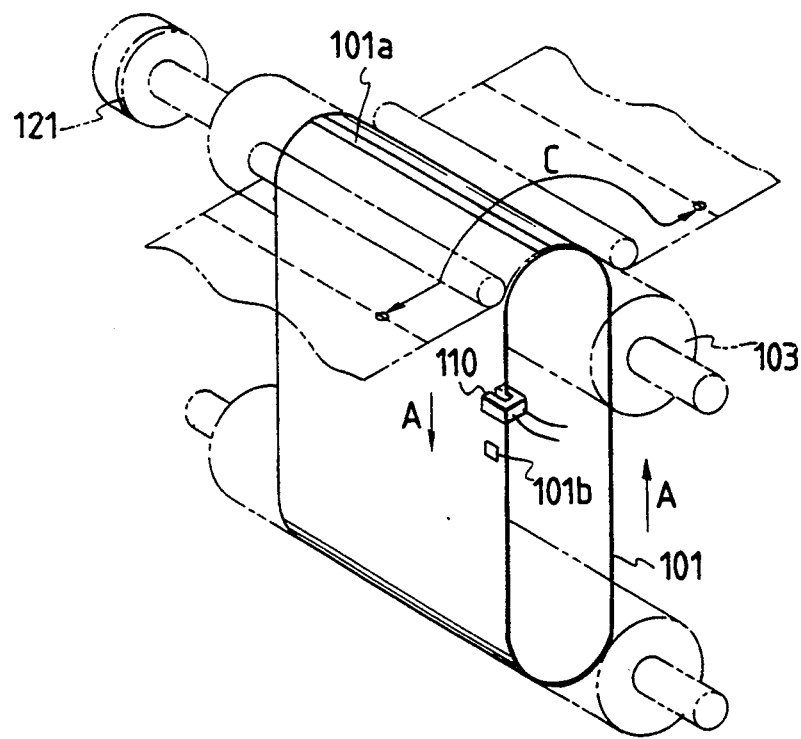
Figure 10:
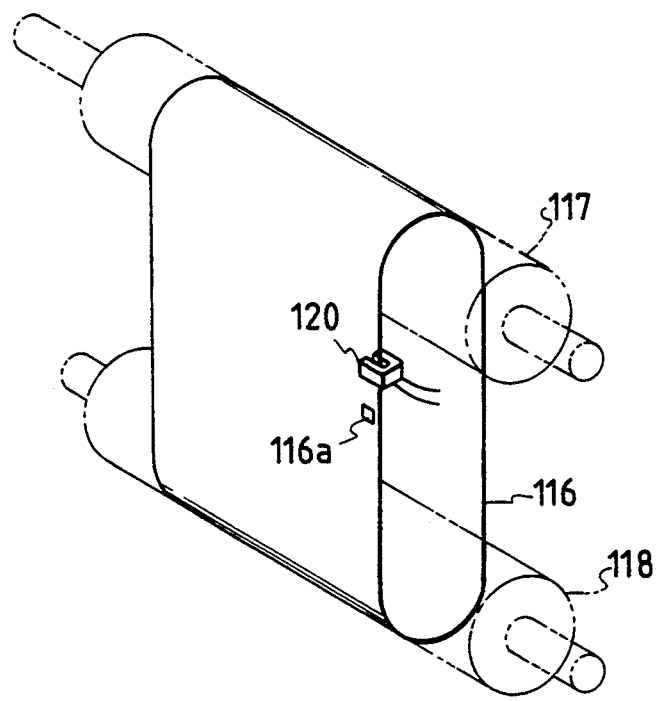
Figure 11:
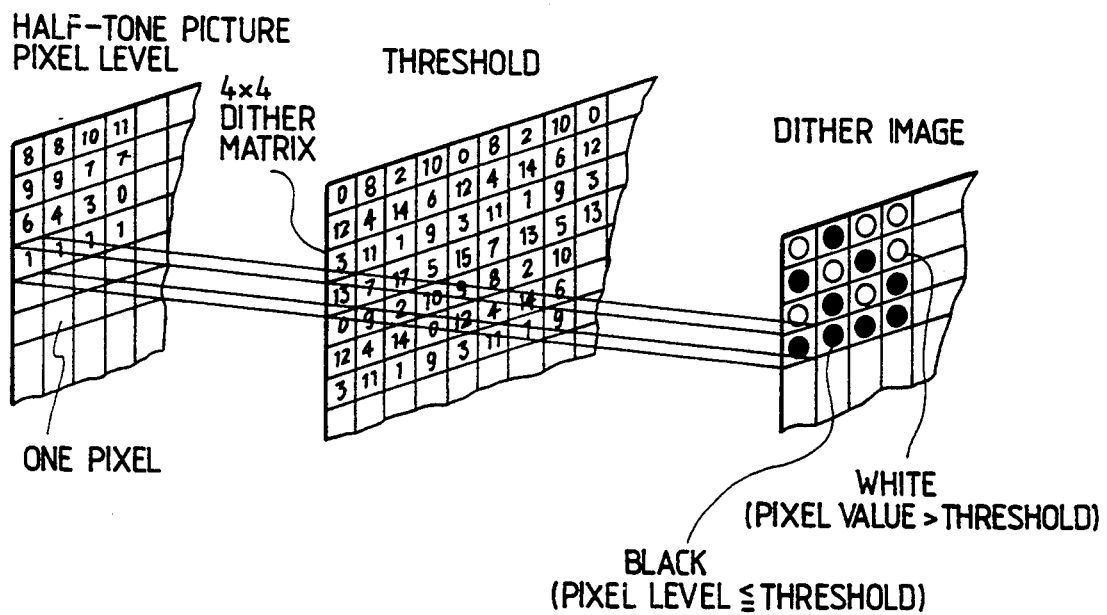
FIGS. 11 and 12 are illustrations for describing a conventional image formation apparatus.
Figure 12:
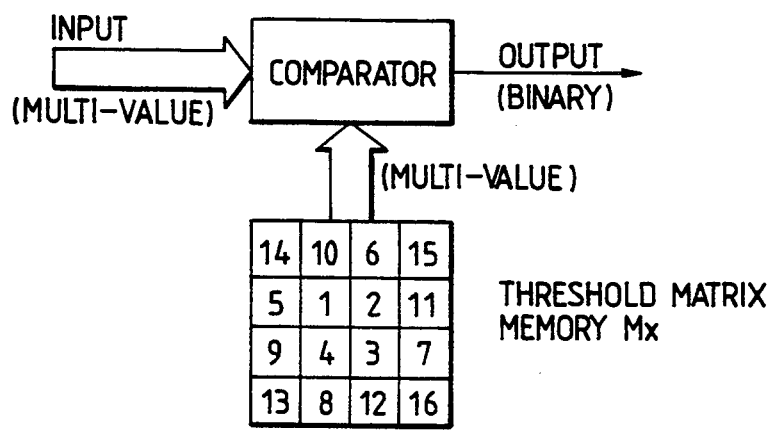

As shown in FIG. 9, the photosensitive device reference position sensor 110 is provided in order to detect the position of the joint 101a of the photosensitive device 101, i.e., to detect a photosensitive device reference mark such as a slit 101b disposed at a predetermined position in relation to the joint 101a. In FIG. 9, numeral 121 represents a clutch mechanism for controlling the rotation of the photosensitive device 101 by supplying and cutting a power from a drive source (not shown). The clutch mechanism 121 is connected to a drive shaft of the photosensitive device carrying roller 103.

Returning again to FIG. 8, the developing devices 106 B to 106Y are respectively coupled to cams 115B, 115C, 115M and 115Y which are pivotally supported by the printer body to be rotatable in accordance with color selection signals whereby a selected developing device (for example, 106B) comes into contact with the photosensitive device 101 to form a toner image by the corresponding toner (for example, black toner). Here, the non-selected developing devices are positioned to be away from the photosensitive device 101. The intermediate transfer unit 107 comprises an intermediate transfer device having a jointless loop configuration and made of an electrically conductive resin or the like, two intermediate-device carrying rollers 117, 118 for rotationally supporting the intermediate transfer device 116, and an intermediate transfer roller 119 disposed to be in opposed relation to the photosensitive device 101 with the intermediate transfer device 116 being interposed therebetween. The intermediate transfer roller 119 is for transferring the toner image from the photosensitive device 101 onto the intermediate transfer device 116. Here, although the peripheral length L1 of the photosensitive device 101 is designed to be substantially equal to the peripheral length L2 of the intermediate transfer device, at least the relation of $L1 \leq L2$ is arranged to be always satisfied. As shown in FIG. 10, an intermediate transfer device reference position sensor 120 detects an intermediate transfer device reference mark such as a slit 116a disposed at one end portion of the intermediate transfer device 116 so as to detect the reference position of the intermediate transfer device 116.

Returning again to FIG. 8, numeral 122 designates a cleaning device for removing the remaining toner on the intermediate transfer device 116. The cleaning device 122 is arranged to be separated from the intermediate transfer device 116 while a combined image is formed on the intermediate transfer device 116 and to be brought into contact with the intermediate transfer device 116 only when cleaning it. Further, numeral 123 denotes a copy sheet cassette for encasing copy sheets 124. Each of the copy sheets 124 is fed by a semicircular feeding roller 125 to a carrying passage 126 one by one. Numeral 127 depicts a resist roller for temporarily stopping the copy sheet 124 so that the copy sheet 124 is coincident in position with the combined image formed on the intermediate transfer device 116. The resist roller 127 is pressed against a non-driven roller 128. Further, numeral 129 represents a transfer roller for transferring the combined image on the intermediate transfer device 116 onto the copy sheet 124. The transfer roller 129 comes into contact with the intermediate transfer device 116 and rotates only when transferring the combined image onto the copy sheet 124. Numeral 130 is a fixing device including a pressing roller 132 and a heat roller 131 having a heat source therein. The copy sheet 124 having the combined image thereon is held between the heat roller 131 and the pressing roller 132 so that the combined image is fixed onto the copy sheet 124 by means of the heat and pressure in response to the rotations of the heat roller 131 and the pressing roller 132, thereby creating a color image on the copy sheet 124.

In operation, the photosensitive device 101 and the intermediate transfer device 116 are respectively driven by means of drive sources (not shown) so that the moving speeds of the peripheral portions thereof are constant and become coincident with each other. Further, the image-forming area on the intermediate transfer device 116 is previously determined on the basis of the output signal (reference position signal) of the intermediate transfer device reference position sensor 120 so that the joint 101a of the photosensitive device 101 is position-adjusted so as not to be coincident in position with the intermediate transfer roller 119. The intermediate transfer device 116 is driven in response to a synchronizing signal.

In this state, a high voltage is applied to the electrifying line 111 of the electrifying device 104 so that a corona discharge occurs to cause the surface of the photosensitive device 101 to be evenly electrified up to −700 to −800 V. Secondly, the photosensitive device 101 is rotated in the arrow A direction and the exposure optical system 105 is operated so that the evenly electrified surface of the photosensitive device 101 is exposed to the exposure light beam (a laser beam) 114 corresponding to one of the colors (for example, black), thereby forming an electrostatic latent image on the photosensitive device 101. At this time, this electrostatic latent image is formed so that the joint 101a of the photosensitive device 101 is not coincident in position with the image forming area of the intermediate transfer device 116 previously determined on the basis of the output signal of the intermediate transfer device reference position sensor 120. On the other hand, the developing device (for example 106B) is pressed in a direction indicated by an arrow B by means of the rotation of the cam (for example, 115B) due to a color selection signal so as to come into contact with the photosensitive device 101. With this contact therewith, the black toner is attached to the electrostatic latent image portion formed on the photosensitive device 101, thereby forming a toner image and then terminating one developing operation. After the termination of the developing operation, the developing device 106B is separated from the photosensitive device 101 by means of the 180° rotation of the cam 115B. The toner image formed on the photosensitive device 101 by the developing device is transferred onto the intermediate transfer device 116 by applying a high voltage to the intermediate transfer roller 119 positioned to come into contact with the photosensitive device 101. The remaining toner which is not transferred from the photosensitive device 101 to the intermediate transfer device 116 is removed by the cleaning device 108 and the charge on the photosensitive device 101 is then removed by the charge-removing device 109. Thereafter, in response to selection of a cyan color, the cam 115c is rotated so that the developing device 106C is pressed toward the photosensitive device 101 to be brought into contact therewith, thereby starting the developing operation.

In the case of the copy machine or printer for forming a color image by using four colors, the similar operation is repeatedly performed four times so as to form four B, C, M and Y toner images which are in turn overlaid with each other to form a combined image. With the transfer roller 129 being brought into contact with the intermediate transfer device 116 and a high voltage being applied to the transfer roller 129, the formed combined image is at a time transferred onto the copy sheet 124 supplied from the copy sheet cassette 123 through the carrying passage 126. Subsequently, the copy sheet 124 on which the toner images are transferred is supplied to the fixing device 130 so that the toner images are fixed on the copy sheet 124 by means of the heating and pressure due to the heat roller 131 and the pressing roller 132 and outputted as a color image. The toner remaining on the intermediate transfer device 116 is removed by the intermediate transfer device cleaning device 122. The cleaning device 122 is positioned to be separated from the intermediate transfer device 116 until one combined image is obtained, and brought into contact with the intermediate transfer device 116 when the combined image obtained and transferred onto the copy sheet 124 by the transfer roller 129.

With the above-described operations, the recording of one color image is completed.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, the present invention is not limited to the above-described laser beam printer but applicable to a heat transfer system or an ink jet system and further to a system using a light-emitting diode array or a liquid crystal shutter. In addition, although in the embodiment the color images are piled up on the intermediate transfer device, it is appropriate to piles up the color images on the photosensitive device or the copy sheet.

What is claimed is:

1. An image formation apparatus for performing a gradation recording by changing a size of a dot on the basis of an image data inputted, said apparatus comprising:

division means for dividing an image into a plurality of blocks each comprising a predetermined number of dots;

first gradation processing means for giving a preferential order with respect to a position within each of the plurality of divided blocks so as to process said image data so that the size of one of said dots corresponding to a position whose preferential order is higher is first enlarged on the basis of a density of said image data;

second gradation processing means for processing said image data so that the size of one of said dots is enlarged on the basis of the density of said image data irrespective of the position within said block; and switching means for performing a switching operation between said first and second gradation processing means in accordance with a kind of said image.

2. An image formation apparatus as claimed in claim 1, further comprising density adjusting means for performing a density adjustment only with respect to said image data processed by said first gradation processing means.

3. An image formation apparatus as claimed in claim 1, wherein said switching means selects said second gradation processing means when said image data is a character data or a line drawing data, and selects said first gradation processing means when said image data is not said character data or said line drawing data.

4. An image formation apparatus as claimed in claim 1, wherein said switching means selects said first gradation processing means when said image data is a halftone picture data, and selects said second gradation processing means when said image data is not said halftone picture data.

5. An image formation apparatus as claimed in claim 1, wherein said first gradation processing means further operates for identifying a first group of dots at predetermined first dot positions of each of said plurality of blocks and a second group of dots at predetermined second dot positions of each of said plurality of blocks, and for enlarging the size of dots to be printed from said first group in accordance with the density of said image data before enlarging the size of dots to be printed from said second group in accordance with the density of said image data.

6. An image formation apparatus as claimed in claim wherein said first dot positions are different for each of a plurality of recording colors of a color image and said second dot positions are different for each of said plurality of recording colors.

7. An image formation apparatus for performing a gradation recording by changing a size of a dot on the basis of an image data inputted, said apparatus comprising:
  division means for dividing an image into a plurality of blocks each comprising a predetermined number of dots;
  first gradation processing means for giving a preferential order with respect to a position within each of the plurality of divided blocks so as to process said image data so that the size of one of said dots corresponding to a position whose preferential order is higher is first enlarged on the basis of a density of said image data;
  second gradation processing means for processing said image data so that the size of one of said dots is enlarged on the basis of the density of said image data irrespective of the position within said block;
  switching means for performing a switching operation between said first and second gradation processing means in accordance with a kind of said image; and
  density adjusting means for performing a density adjustment when said switching means selects said first gradation processing means, said density adjusting means performing a density adjustment with respect to said dot corresponding to the position having the higher-preferential order given by said first gradation processing means when lowering the density of said image, and performing a density adjustment with respect to a dot corresponding to position having a lower-preferential order given by said first gradation processing means when heightening the density of said image.

8. An image formation apparatus for performing a gradation recording of a color image by changing a size of a dot on the basis of a color image data inputted, said apparatus comprising:
  division means for dividing an image into a plurality of blocks each comprising a predetermined number of dots;
  first gradation processing means for giving a different preferential order with respect to a position within each of the plurality of divided blocks at every recording color so as to process said image data so that the size of one of said dots corresponding to a position whose preferential order is higher is first enlarged on the basis of a density of said image data;
  second gradation processing means for processing said image data so that the size of one of said dots is enlarged on the basis of the density of said image data irrespective of the position within said block; and
  switching means for performing a switching operation between said first and second gradation processing means in accordance with a kind of said image; and
  density adjustment means for performing a density adjustment only when said switching means said first gradation processing means.

9. An image formation apparatus as claimed in claim 8; wherein said switching means selects said second gradation processing means when said image data is a character data or a line drawing data, and selects said first gradation processing means when said image data is not said character data or said line drawing data.

10. An image formation apparatus as claimed in claim 8, wherein said switching means selects said first gradation processing means when said image data is a halftone picture data, and selects said second gradation processing means when said image data is not said halftone picture data.

11. An image formation apparatus as claimed in claim 8, wherein said first gradation processing means further operates for identifying a first group of dots at predetermined first dot positions of each of said plurality of blocks and a second group of dots at predetermined second dot positions of each of said plurality of blocks, and for enlarging the size of dots to be printed from said first group in accordance with the density of said image data before enlarging the size of dots to be printed from said second group in accordance with the density of said image data.

12. An image formation apparatus as claimed in claim 11, wherein said first dot positions are different for each recording color of a color image and said second dot positions are different for each recording color of the color image.

13. An image formation apparatus for performing a gradation recording of a color image by changing a size of a dot on the basis of a color image data inputted, said apparatus comprising:
  division means for dividing an image into a plurality of blocks each comprising a predetermined number of dots;
  first gradation processing means for giving a different preferential order with respect to a position within each of the plurality of divided blocks at every recording color so as to process said image data so that the size of one of said dots corresponding to a position whose preferential order is higher is first enlarged on the basis of a density of said image data;

second gradation processing means for processing said image data so that the size of one of said dots is enlarged on the basis of the density of said image data irrespective of the position within said block;

switching means for performing a switching operation between said first and second gradation processing means in accordance with a kind of said image; and density adjusting means for performing a density adjustment when said switching means selects said first gradation processing means; said density adjusting means performing a density adjustment with respect to said dot corresponding to the position having the higher-preferential order given by said first gradation processing means when lowering the density of said image, and performing a density adjustment with respect to a dot corresponding to a position having a lower-preferential order given by said first gradation processing means when heightening the density of said image.

14. An image formation apparatus for performing a gradation recording by changing a size of a dot on the basis of an image data inputted, said apparatus comprising:

division means for dividing an image into a plurality of blocks each comprising a predetermined number of dots;

first gradation processing means for memorizing a first gradation characteristic defining relationship between an input image level and a print output level as a function of a position of a dot in each block, for finding a first print output level of a dot in accordance with a density level of an input image with reference to said first gradation characteristic, and for determining the magnitude of a dot to be printed in accordance with said first print output level;

second gradation processing means for memorizing a second gradation characteristic defining relationship between an input image level and a print output level irrespective of a position of a dot in each block, for finding a second print output level of a dot in accordance with a density level of an input image with reference to said second gradation characteristics, and for determining the magnitude of a dot to be printed in accordance with said second print output level; and switching means for performing a switching operation between said first and second gradation processing means in accordance with a kind of said image.

15. An image formation apparatus for performing a gradation recording of a color image by changing a size of a dot on the basis of a color image data inputted, said apparatus comprising:

division means for dividing an image into a plurality of blocks each comprising a predetermined number of dots;

first gradation processing means for memorizing a first gradation characteristic defining different relationship between an input image level and a print output level as a function of a position of a dot in each block at every recording color, for finding a first print output level of a dot in accordance with a density level of an input image with reference to said first gradation characteristic, and for determining the magnitude of a dot to be printed in accordance with said first print output level;

second gradation processing means for memorizing a second gradation characteristic defining relationship between an input image level and a print output level irrespective of a position of a dot in each block, for finding a second print output level of a dot in accordance with a density level of an input image with reference to said second gradation characteristic, and for determining the magnitude of a dot to be printed in accordance with said second print output level; and switching means for performing a switching operation between said first and second gradation processing means in accordance with a kind of said image.

16. An image formation apparatus as claimed in claim 15, wherein said first gradation processing means further operates for identifying first and second groups of dots at predetermined positions of each of said blocks, and for determining the magnitudes of dots to be printed from said first group in accordance with the density level of said input image before determining the magnitudes of dots to be printed from said second group in accordance with the density level of said input image.

* * * * *

UNITED STATES PATENT AND TRADEMARK OFFICE
CERTIFICATE OF CORRECTION

PATENT NO. : 5,337,167
DATED : August 9, 1994
INVENTOR(S) : Seiichiro HIRATSUKA et al It is certified that error appears in the above-indentified patent and that said Letters Patent is hereby corrected as shown below:

On the title page, please delete item [30] and insert the following therefor:

--[30]    Foreign Application Priority Data
    Apr 3, 1991 [JP]   Japan ............ 3-70891
    May 7, 1991 [JP]   Japan ............ 3,101273--

Signed and Sealed this

Twenty-eight Day of February, 1995

Attest:

BRUCE LEHMAN

Attesting Officer        Commissioner of Patents and Trademarks